United States Patent [19]
Kameya

[11] 3,858,126
[45] Dec. 31, 1974

[54] MUTUAL INDUCTANCE ADJUSTING CIRCUIT

[75] Inventor: Kasuo Kameya, Saitama-ken, Japan

[73] Assignee: Toko, Inc., Tokyo, Japan

[22] Filed: June 13, 1973

[21] Appl. No.: 369,483

[30] Foreign Application Priority Data
June 16, 1972 Japan ................................ 47-59404

[52] U.S. Cl. ................ 333/29, 333/24 R, 333/70 R
[51] Int. Cl. ........................... H03h 7/18, H03h 7/32
[58] Field of Search ............. 333/70 R, 29, 24 R, 72

[56] References Cited
UNITED STATES PATENTS

| | | | |
|---|---|---|---|
| 2,702,372 | 2/1955 | Hickey | 333/70 R X |
| 3,344,369 | 9/1967 | Bies et al. | 333/72 |

*Primary Examiner*—James W. Lawrence
*Assistant Examiner*—Marvin Nussbaum
*Attorney, Agent, or Firm*—Depaoli & O'Brien

[57] ABSTRACT

A mutual inductance adjusting circuit employable with a network comprising at least two series-connected inductors and a shunt capacitor or capacitors. A compensating inductance element or elements are provided through which said shunt capacitor or capacitors are grounded, whereby the mutual inductance between the series inductors is changed by a value equal in magnitude but opposite in sign to the compensating inductance. Thus, the mutual inductance between the series inductors can be adjusted by shiftably selecting the value for the compensating inductance.

5 Claims, 11 Drawing Figures

MUTUAL INDUCTANCE ADJUSTING CIRCUIT

This invention relates to a mutual inductance adjusting circuit, and more particularly to such a circuit which is applicable to a delay line comprising a series-connected inductors and shunt capacitors.

It is known in the art that the characteristics of a delay line comprising series-connected inductors and shunt capacitors can be improved by designing it such that the odd-order mutual inductances are positive while the even-order ones are negative.

In order to adjust the mutual inductance between two inductors inductively coupled together, two methods are available: one of them is to move the inductors toward or away from each other, and the other one is to move a magnetic member into or out of the gap between the inductors. However, it has been found that neither of these methods is satisfactory because in the case of the former method, a relatively bulky, sophisticated mechanism is required for effecting the aforementioned inductor movement, and in the case of the latter method, the inductance values of the inductors per se are changed so that when it is applied to a delay line of the above-mentioned type, the delay time thereof is also changed.

Accordingly, it is primary object of this invention to provide a novel mutual inductance adjusting circuit which is so designed as to avoid the above-described difficulties.

Another object of this invention is to provide a simplified but effective circuit arrangement for improving the characteristics of a delay line comprising series-connected inductors inductively coupled together and shunt capacitors.

Still another object of this invention is to provide a mutual inductance adjusting circuit for a delay line of the foregoing type, wherein a compensating inductance element of elements are provided for the purpose of properly adjusting the mutual inductance of each inductive coupling between the series-connected inductors.

A further object of this invention is to provide a delay line of the type mentioned just above, wherein the value for the compensating inductance element is so selected that the effective even-order mutual inductances are negative.

A still further object of this invention is to provide a mutual inductance adjusting circuit for a delay line of the foregoing type, wherein the values for the compensating inductances are so selected that the effective even-order mutual inductances are negative while the effective odd-order ones are positive but reduced.

Basically, according to this invention, there is provided a mutual inductance adjusting circuit employable with a network comprising at least two series-connected inductors and a shunt capacitor or capacitors, wherein a compensating inductance element is provided through which the shunt capacitor or capacitors are connected to a reference potential point such as earth, whereby the mutual inductance between the series inductors is changed by a value equal in magnitude but opposite in sign to the compensating inductance.

Other objects, features and advantages of this invention will become apparent from the following detailed description taken in conjunction with the accompanying drawings.

Figure 1:
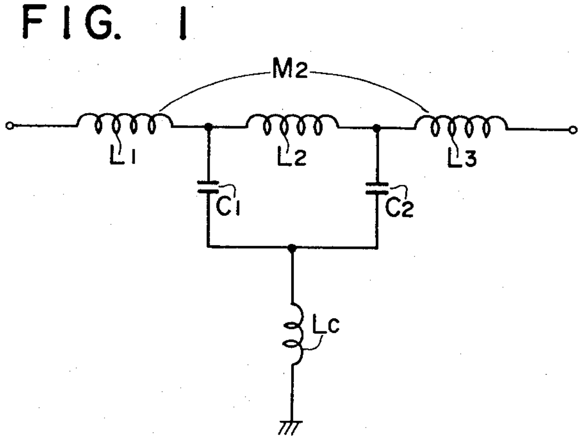
FIG. 1 is a diagram showing a basic example of the mutual inductance adjusting circuit according to this invention.

Referring to FIG. 1, there is shown a basic example of the mutual inductance adjusting circuit according to this invention, wherein inductors $L_1$, $L_2$ and $L_3$ are connected in series with each other, and capacitors $C_1$ and $C_2$ are connected at one end to the connection points between $L_1$ and $L_2$ and between $L_2$ and $L_3$ respectively. A compensating inductance element $L_c$, which may be a variable one, is provided through which the capacitors $C_1$ and $C_2$ are grounded at the other end. In this case, the series inductors $L_1$ and $L_3$ are inductively coupled to each other with mutual inductance $M_2$ (even-order mutual inductance). The adjacent inductors may also be inductively coupled to each other.

With this arrangement, it has been found that the effective mutual inductance between the inductors $L_1$ and $L_3$ becomes $M_2 - L_c$. Thus, the effective even-order mutual inductance between the two inductors $L_1$ and $L_3$ can be made negative simply by suitably selecting the value of the compensating inductor $L_c$, without either requiring any bulky, sophisticated mechanism or having any substantial effect on the transmission characteristics of the network constituted by the series inductors $L_1$, $L_2$ and $L_3$ and shunt capacitors $C_1$ and $C_2$. It will readily be apparent to those skilled in the art that in the case where there is no actual inductive coupling between the inductors, the network operates as if the inductors $L_1$ and $L_3$ were coupled to each other with mutual inductance equal in magnitude but opposite in sign to the compensating inductance $L_c$.

What has been described above in connection with FIG. 1 will not be theoretically proved with reference to FIGS. 2A, 2B and 3A, 3B.

Figure 2A:
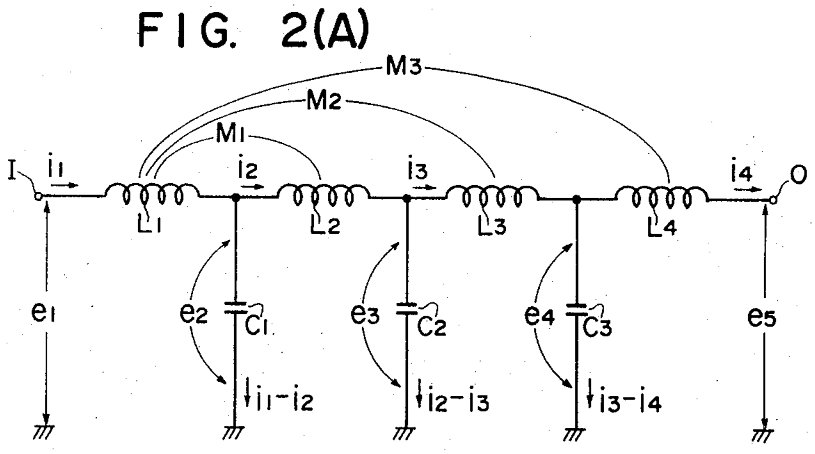
FIGS. 2A, 2B and 3A, 3B are diagrams useful for explaining the principles of this invention.

Referring first to FIG. 2A, there is shown a circuit arrangement constituting a ladder type low-pass filter, which comprises inductors $L_1$, $L_2$, $L_3$ and $L_4$ connected in series with each other, and shunt capacitors $C_1$, $C_2$ and $C_3$ connected at one end to the junctions of the series inductors and grounded at the other end. The first inductor $L_1$ is inductively coupled to the inductors $L_2$, $L_3$ and $L_4$ with mutual inductances $M_1$, $M_2$ and $M_3$ respectively. Assume, as shown in FIG. 1A, that a voltage $e_1$ is applied to an input terminal I, that currents $i_1$, $i_2$, $i_3$ and $i_4$ flow through the inductors $L_1$, $L_2$, $L_3$ and $L_4$ respectively, that voltages $e_2$, $e_3$ and $e_4$ occur across the capacitors $C_1$, $C_2$ and $C_3$, that currents $i_1 - i_2$, $i_2 - i_3$ and $i_3 - i_4$ flow through the capacitors $C_1$, $C_2$ and $C_3$ respectively, and that a voltage $e_5$ appears at an output terminal 0.

Figure 2B:
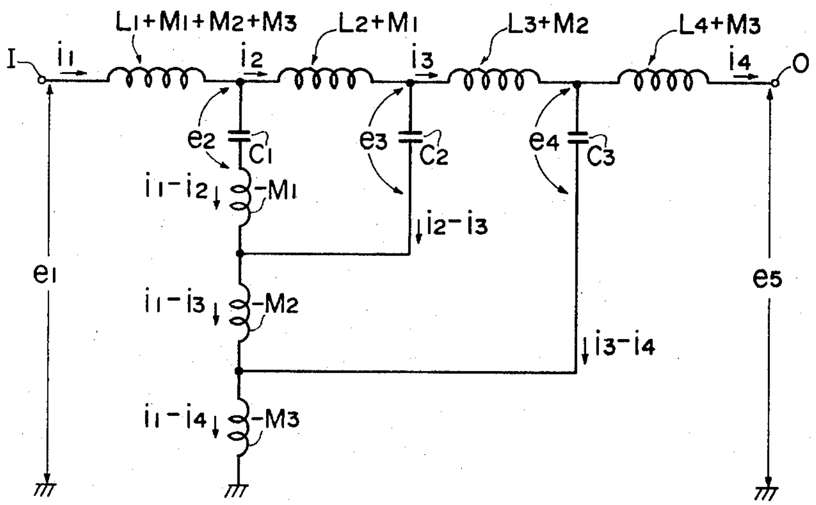

Referring next to FIG. 2B, there is shown a circuit comprising inductors $L_1 + M_1 + M_2 + M_3$, $L_2 + M_1$, $L_3 + M_2$ and $L_4 + M_3$ connected in series with each other, and shunt capacitors $C_1$, $C_2$ and $C_3$ connected at one end to the junctions of the series inductors respectively. The shunt capacitor $C_1$ is grounded through a series circuit of inductors $-M_1$, $-M_2$ and $-M_3$; $C_2$ is connected to the junction between $-M_1$ and $-M_2$ so as to be grounded through $-M_2$ and $-M_3$; and $C_3$ is connected to the junction between $-M_2$ and $-M_3$ so as to be grounded through $-M_3$. It is assumed that voltage and currents occurring in FIG. 1B correspond to those of FIG. 1A.

As will readily be apparent to those skilled in the art, the following equations hold for the circuit shown in FIG. 2A:

$$e_1 = A_{t1}e_5 + B_{t1}i_4 \quad (1)$$
$$i_1 = C_{t1}e_5 + D_{t1}i_4 \quad (2)$$

Furthermore, the following equations also hold true in the case of FIG. 2A:

$$pL_1i_1 + pM_1i_2 + pM_2i_3 + pM_3i_4 = e_1 - e_2 \quad (3)$$

where $$p = j\omega \; pL_2i_2 + pM_1i_1 = e_2 - e_3 \quad (4)$$
$$pL_3i_3 + pM_2i_1 = e_3 - e_4 \quad (5)$$
$$pL_4i_4 + pM_3i_1 = e_4 - e_5 \quad (6)$$
$$i_1 - i_2 = pC_1e_2 \quad (7)$$
$$i_2 - i_3 = pC_2e_3 \quad (8)$$
$$i_3 - i_4 = pC_3e_4 \quad (9)$$

It is possible to determine $A_{t1}$, $B_{t1}$, $C_{t1}$ and $D_{t1}$ in Equations (1) and (2) by eliminating $e_2$, $e_3$, $e_4$, $i_2$ and $i_3$ from the seven Equations (3) to (9).

In the case of FIG. 1B, the following equations hold true:

$$e_1 = A_{t1}'e_5 + B_{t1}'i_4 \quad (1)'$$
$$i_1 = C_{t1}'e_5 + D_{t1}'i_4 \quad (2)'$$
$$p(L_1 + M_1 + M_2 + M_3)i_1 = e_1 - e_2 - p(-M_1)(i_1 - i_2)$$
$$-p(-M_2)(i_1 - l_3) - p(-M_3)(i_1 - i_4) \quad (10)$$
$$p(L_2 + M_1)i_2 = e_2 + p(-M_1)(i_1 - i_2) - e_3 \quad (11)$$
$$p(L_3 + M_2)i_3 = e_3 + p(-M_2)(i_1 - i_3) - e_4 \quad (12)$$
$$p(L_4 + M_3)i_4 = e_4 + p(-M_3)(i_1 - i_4) - e_5 \quad (13)$$
$$i_1 - i_2 = pC_1e_2 \quad (14)$$
$$i_2 - i_3 = pC_2e_3 \quad (15)$$
$$i_3 - i_4 = pC_3e_4 \quad (16)$$

It is to be noted here that Equation (10) can be rewritten as follows:

$$pL_1i_1 + pM_1i_1 + pM_2i_1 + pM_3i_1 = e_1 - e_2 + pM_1i_1 - pM_1i_2 + pM_2i_1 - pM_2i_3 + pM_3i_1 - pM_3i_4$$
$$pL_1i_1 + pM_1i_2 + pM_2i_3 + pM_3i_4 = e_1 - e_2$$

which is identical to Equation (3) relating to FIG. 2A. Furthermore, Equation (11) can be rewritten as follows:

$$pL_2i_2 + pM_1i_2 = e_2 - pM_1i_1 + pM_1i_2 - e_3$$
$$pL_2i_2 + pM_1i_1 = e_2 - e_3$$

which is identical to Equation (4) relating to FIG. 2A. Similarly, Equations (12), (13), (14), (15) and (16) relating to FIG. 2B caan be rewritten to be identical to Equations (5), (6), (7), (8) and (9) relating to FIG. 2A, respectively, as will readily be apparent to those skilled in the art. Thus, it will be appreciated that $A_{t1}$, $B_{t1}$, $C_{t1}$ and $D_{t1}$ in Equations (1) and (2) representing the fundamental matrix of the circuit shown in FIG. 2A are equal to $A_{t1}'$, $B_{t1}'$, $C_{t1}'$ and $D_{t1}'$ in Equations (1)' and (2)' representing the fundamental matrix of the circuit shown in FIG. 2B, respectively, and therefore that the circuits of FIGS. 2A and 2B are equivalent to each other.

Figure 3A:
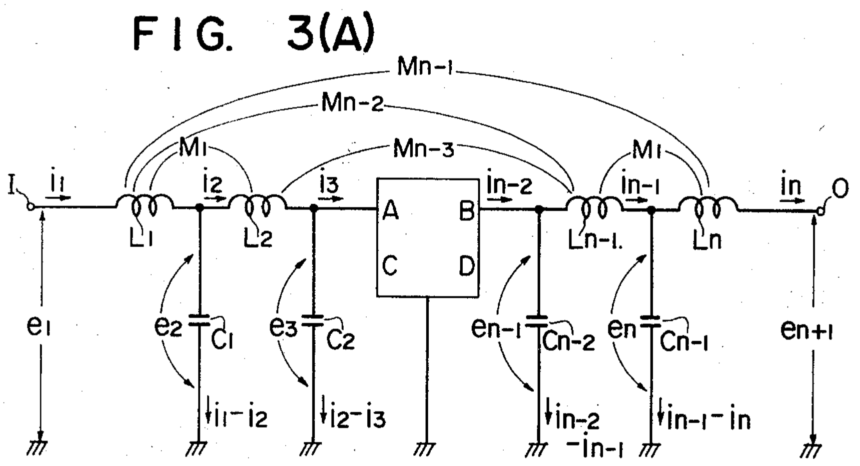

Referring next to FIG. 3A, there is shown another version of the circuit arrangement useful for explaining the principles of this invention. It will be proved in the following discussion that the circuit shown in FIG. 3A is equivalent to that shown in FIG. 3B, on the assumption that the voltages and currents established therein are as shown in the drawings.

In the case of FIG. 3A, the following equations hold true:

$$e_1 = A_{t2}e_{n+1} + B_{t2}i_n \quad (17)$$
$$i_1 = Ct2e_{n+1} + D_{t2}i_n \quad (18)$$
$$pL_1i_1 + pM_1i_2 + pM_{n-2}i_{n-1} + pM_{n-1}i_n = e_1 - e_2 \quad (19)$$
$$pL_2i_2 + pM_1i_1 + pM_{n-3}i_{n-1} = e_2 - e_3 \quad (20)$$
$$pL_{n-1}i_{n-1} + pM_1i_n + pM_{n-3}i_2 + pM_{n-2}i_1 = e_{n-1} - e_n \quad (21)$$
$$pL_ni_n + pM_1i_{n-1} + pM_{n-1}i_1 = e_n - e_{n-1} \quad (22)$$
$$e_3 = Ae_{n-1} + Bi_{n-2} \quad (23)$$
$$i_3 = Ce_{n-1} + Di_{n-2} \quad (24)$$
$$i_1 - i_2 = pC_1e_2 \quad (25)$$
$$i_2 - i_3 = pC_2e_3 \quad (26)$$
$$i_{n-2} - i_{n-1} = pC_{n-2}e_{n-1} \quad (27)$$
$$l_{n-1} - i_n = pC_{n-1}e_n \quad (28)$$

It is possible to determine $A_{t2}$, $B_{t2}$, $C_{t2}$ and $D_{t2}$ in Equations (17) and (18) by eliminating $e_2$, $e_3$, $e_{n-1}$, $e_n$, $i_2$, $i_3$, $i_{n-2}$ and $i_{n-1}$ from the 10 Equations (19) to (28). Incidentally, portions A, B, C and D shown in FIGS. 3A and 3B constitute a network having a fundamental matrix represented by the Equations (23) and (24), and the network is grounded via a common terminal at the input and output sides thereof.

Figure 3B:
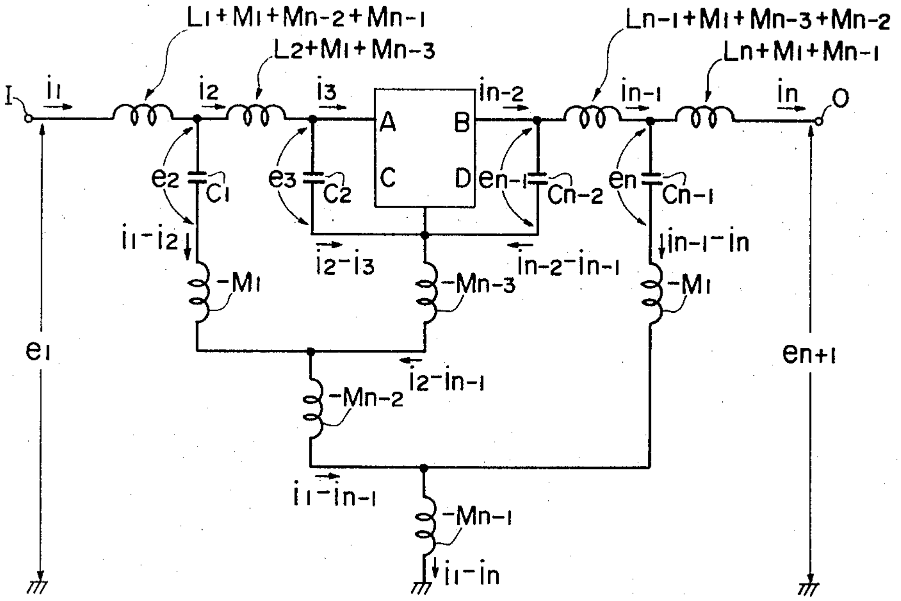

In the case of FIG. 3B, the following equations hold true:

$$e_1 = A_{t2}'e_{n+1} + B_{t2}'i_n \quad (17)'$$
$$i_1 = C_{t2}'e_{n+1} + D_{t2}'i_n \quad (18)'$$
$$p(L_1 + M_1 + M_{n-2} + M_{n-1})i_1 = e_1 - e_2 - p(-M_1)(i_1 - i_2) - p(-M_{n-2})(i_1 - i_{n-1}) - p(-M_{n-1})(i_1 - i_n) \quad (29)$$
$$p(L_2 + M_1 + M_{n-3})i_2 = e_2 + p(-M_1)(i_1 - i_2) - e_3 - p(-M_{n-3})(i_2 - i_{n-1}) \quad (30)$$
$$p(L_{n-1} + M_1 + M_{n-3} + M_{n-2})i_{n-1} = e_{n-1} + p(-M_{n-3})(i_2 - i_{n-1}) + p(-M_{n-2})(i_1 - i_{n-1}) - e_n - p(-M_1)(i_{n-1} - i_n) \quad (31)$$
$$p(L_n + M_1 + M_{n-1})i_n = e_n + p(-M_1)(i_{n-1} - i_n) + p(-M_{n-1})(i_1 - i_n) - e_{n+1} \quad (32)$$
$$e_3 = Ae_{n-1}Bi_{n-2} \quad (33)$$
$$i_3 = Ce_{n-1} = Di_{n-2} \quad (34)$$
$$i_1 - i_2 = pC_1e_2 \quad (35)$$
$$i_2 - i_3 = pC_2e_3 \quad (36)$$
$$i_{n-2} - i_{n-1} = pC_{n-2}e_{n-1} \quad (37)$$
$$i_{n-1} - i_n = pC_{n-1}e_n \quad (38)$$

It is possible to determine $A_{t2}'$, $B_{t2}'$, $C_{t2}'$ and $D_{t2}'$ in Equations (17)' and (18)' from the 10 Equations (29) to (38). As in the case of FIGS. 1A and 1B, Equations (29) to (38) relating to FIG. 2B can be rewritten to be identical to Equations (19) to (28) relating to FIG. 2A, respectively. Thus, it will be appreciated that $A_{t2}$, $B_{t2}$, $C_{t2}$ and $D_{t2}$ in Equations (17) and (18) representing the fundamental matrix of the circuit shown in FIG. 2A are equal to $A_{t2}'$, $B_{t2}'$, $C_{t2}'$ and $D_{t2}'$ in Equations (17)' and (18)' representing the fundamental matrix of the circuit shown in FIG. 2B, respectively, and therefore that the circuits of FIGS. 3A and 3B are equivalent to each other.

Although, in the foregoing, description has been made of the cases where all the mutual inductances are positive, the same result can be obtained in the cases where such mutual inductances are negative, too.

What has been described above can be generalized as follows: For a circuit comprising series inductance elements and shunt capacitance elements, wherein the pth series inductance element $L_p$ and $q$th series inductance element $L_q$ are inductively coupled to each other with mutual inductance $\pm M_R$, there is established an equivalent circuit wherein the mutual inductance $\pm M_R$ is eliminated, $\pm M_R$ is added to $L_p$ and $L_q$, the shunt capacitance elements connected at one end to the inductance element junctions existing between the inductance elements $L_p$ and $L_q$ are connected together at the other end, and an inductance $\mp M_R$ is inserted between the connection point of the capacitance elements connected together and earth.

FIGS. 4 through 7 illustrate this invention as applied to delay lines comprising series inductors and shunt capacitors.

Figure 4A:
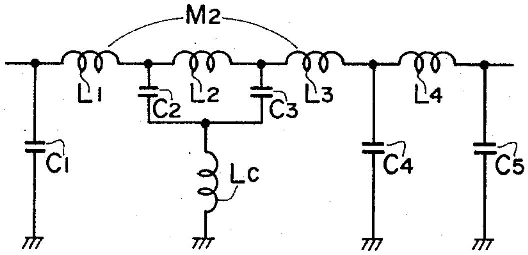
FIG. 4A is a circuit diagram showing a delay line embodying this invention.
Figure 4B:
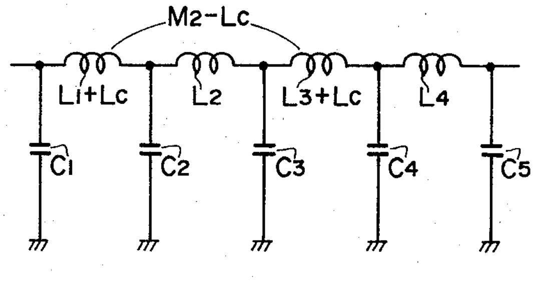
FIG. 4B shows an equivalent circuit of FIG. 4A.

Referring now to FIG. 4A, there is shown an embodiment of this invention, which comprises series inductance elements $L_1 \ldots L_4$, shunt capacitance elements $C_1 \ldots C_5$, and a compensating inductance element $L_c$ through which the capacitance elements $C_2$ and $C_3$ are grounded. From what has been explained above with reference to FIGS. 2A, 2B and 3A, 3B, it will readily be noted that the circuit of FIG. 4A is equivalent to that shown in FIG. 4B.

Figures 5, 6:
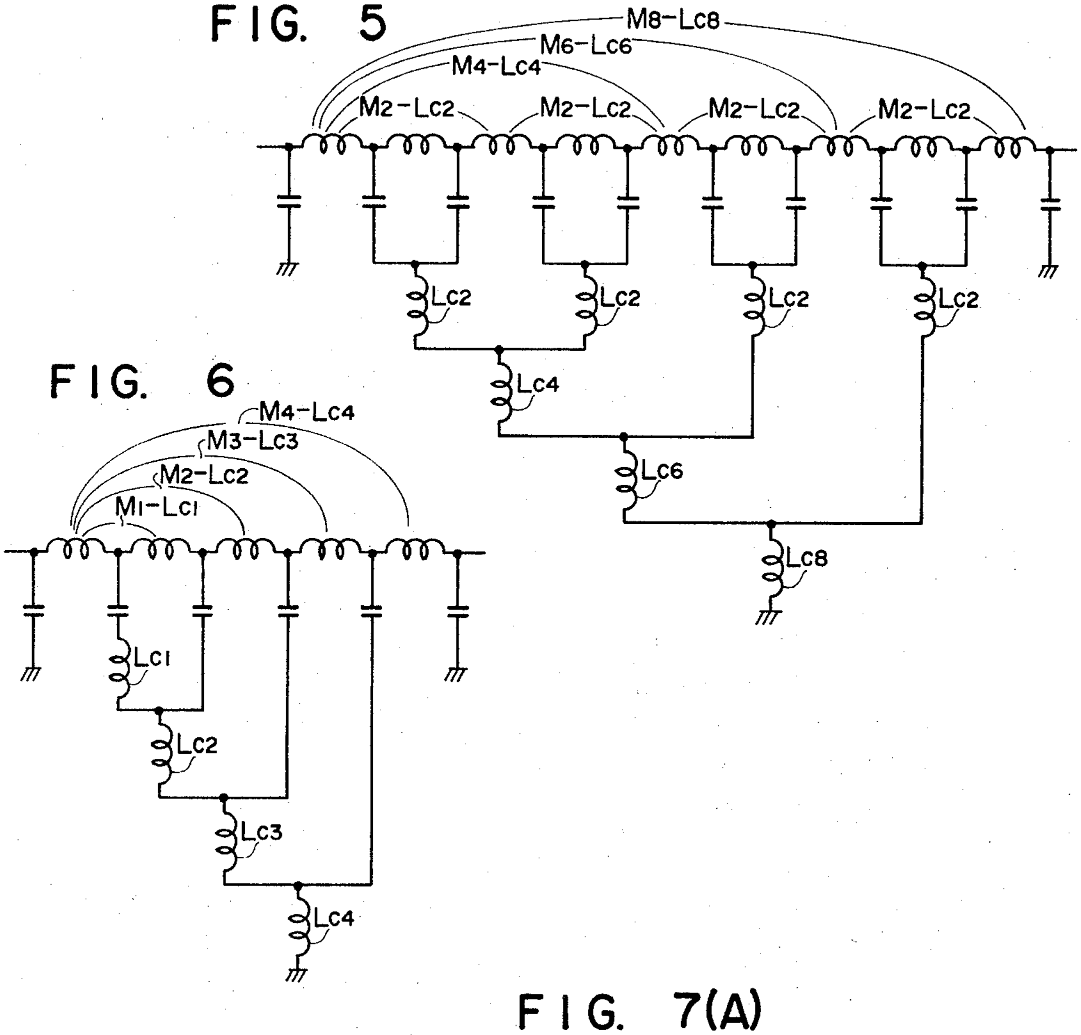
FIG. 5 shows a second embodiment of this invention.
FIG. 6 shows a third embodiment of this invention.

FIG. 5 shows another example in which the eve-norder mutual inductances are adjusted in accordance with this invention.

FIG. 6 shows a further example in which both the even number couplings and odd number couplings, i.e., couplings between inductance elements between which an even number of inductance elements exist, are compensated for in accordance with this invention, as shown by $-L_{c1}$, $-L_{c2}$, $-L_{c3}$ and $-L_{c4}$. Such an arrangement is effective especially with respect to a miniaturized delay line using a ferrite core wherein there is a tendency that the couplings between the coils wound on the core are too strong. In this case, the compensating inductance element $L_{c1}$ may be inserted at the higher potential side rather than at the grounded side of the corresponding capacitance element, as will be apparent to those skilled in the art.

Figure 7A:
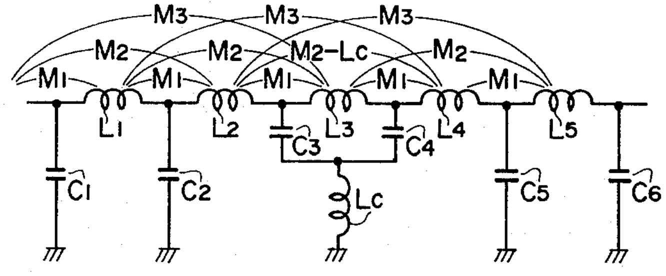
FIG. 7A shows a fourth embodiment of this invention.
Figure 7B:
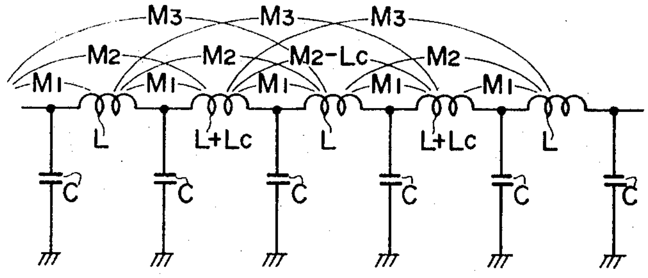
FIG. 7B shows an equivalent circuit of FIG. 7A.

FIG. 7A shows a still further example wherein there are cross couplings $M_1$, $M_2$, $M_3$. Such a situation may occur in the case of a delay line using series inductance elements constituted by a continuous length of wire wound on a coaxial bobbin. In this example, one of the even number couplings indicated by $M_2$ is compensated for by means of a compensating inductance element $L_c$, as will be seen from FIG. 7B which is equivalent to FIG. 7A, and thus the effective mutual inductance $M_2 - L_c$ can easily be made negative by suitably selecting the value for the compensating inductance element $L_c$.

In any one of the foregoing examples, the compensating inductance element may be comprised of a variable inductor, whereby fine adjustment can be effected with respect to any desired one of the couplings without adversely influencing the remaining ones, so that the delay characteristics of a delay line can be controlled very precisely.

It may seem that the delay time will also be changed by the fact that the effective mutual inductance between the series inductors is changed according to this invention; Actually, however, it has been found that no such change in the delay time is caused.

While the present invention has been described with respect to some specific embodiments thereof, it is to be understood that the foregoing description is only exemplary of the invention and various modifications and changes may made therein within the spirit and scope of the invention as defined in the appended claims.

What is claimed is:

1. A mutual inductance adjusting circuit for a network including at least one inductor-capacitor combination unit comprising:

A. at least first, second, and third inductors connected in series with each other;

B. at least first and second capacitors, said first capacitor being connected at one end to the connection point between said adjacent first and second inductors and said second capacitor being connected at one end to the connection point between said adjacent second and third inductors, and C. a compensating inductance element through which said capacitors are connected at the other ends thereof to a reference potential point, whereby the effective value of the mutual inductance at least between said first and third inductors is changed by a value equal in magnitude but opposite in sign to the inductance of said compensating inductance element.

2. A mutual inductance adjusting circuit according to claim 1, wherein said network constitutes a delay line comprising a plurality of said inductor-capacitor combination units which are connected in such a manner as to share one inductor between the respective adjacent inductors of said units and wherein said inductors are inductively coupled to each other, characterized in that said compensating inductance elements are selected so as to make negative the effective value of the mutual inductance between said inductors between which an odd number of inductors exist.

3. A mutual inductance adjusting circuit according to claim 2, including a compensating inductance element for reducing the effective value of the mutual inductance between the inductors between which an even number of inductor exist.

4. A mutual inductance adjusting circuit according to claim 1, wherein said compensating element is variable.

5. A mutual inductance adjusting circuit according to claim 1, wherein said series-connected inductors are formed by a continuous length of wire wound on a coaxial bobbin.

* * * * *